March 9, 1926.

J. FINDLING

CUSHION VEHICLE TIRE

Filed Feb. 14, 1925

1,575,749

Inventor
Joseph Findling,

By F. V. Winters.

Attorney

Patented Mar. 9, 1926.

1,575,749

UNITED STATES PATENT OFFICE.

JOSEPH FINDLING, OF NEW YORK, N. Y., ASSIGNOR OF ONE-HALF TO LUTHER L. CAMPBELL, OF NEW YORK, N. Y.

CUSHION VEHICLE TIRE.

Application filed February 14, 1925. Serial No. 9,221.

*To all whom it may concern:*

Be it known that I, JOSEPH FINDLING, a subject of Austria, residing at New York city, county and State of New York, have invented certain new and useful Improvements in Cushion Vehicle Tires, of which the following is a specification.

This invention relates generally to vehicle tires, and particularly to cushion tires adapted especially for use in connection with the wheels of motor vehicles.

The primary object of the invention is to provide a tire that will possess a high degree of resiliency and yet which will be tough and durable, and which possesses all the advantages incident to the use of pneumatic tires without the disadvantages and annoyances attendant thereto.

A further object of the invention is to provide a cushion tire of such character that the several elements thereof are properly assembled and maintained against relative movement, which may be manufactured and assembled by simplified process, and which requires no attention after once being applied to a wheel.

A still further object is to provide a tire of the character stated featured by the lack of complicated parts or mechanism, which is composed of but few simple and readily assembled parts, all so constructed and arranged as to minimized the opportunity for wear, breakage or derangement, which may be manufactured and supplied to the market at low cost, and which will prove highly effective in practice.

With these objects in view, together with others which will appear as the description proceeds, the invention consists in the novel construction, combination and arrangement of parts, all as will be disclosed more fully hereinafter, illustrated in the accompanying drawings and particularly pointed out in the claims.

Figure 1:
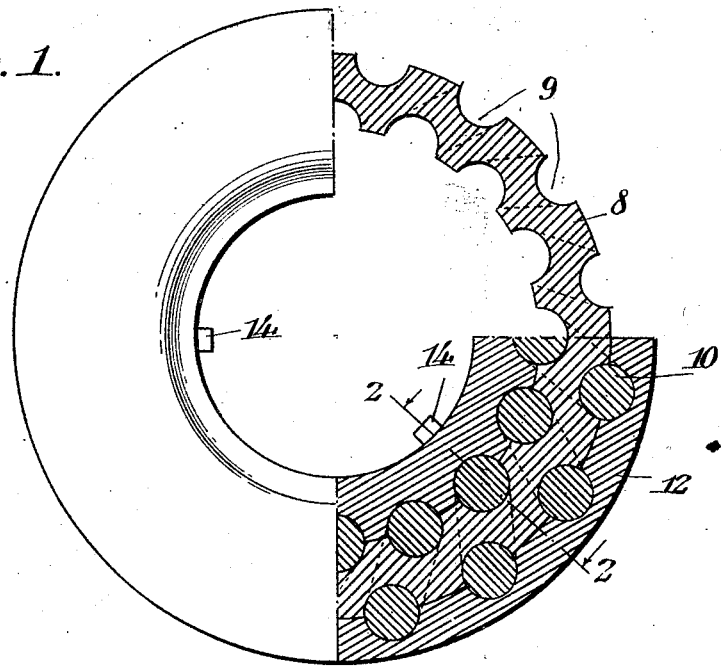
Fig. 1 is a side elevation, parts broken away, of a tire core embodying the invention.
Figure 2:
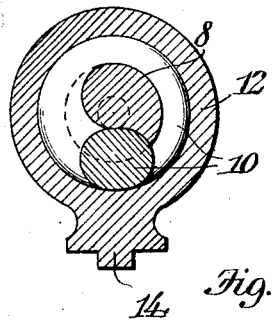
Fig. 2 is a transverse sectional view taken on the line 2—2 of Fig. 1.
Figure 3:
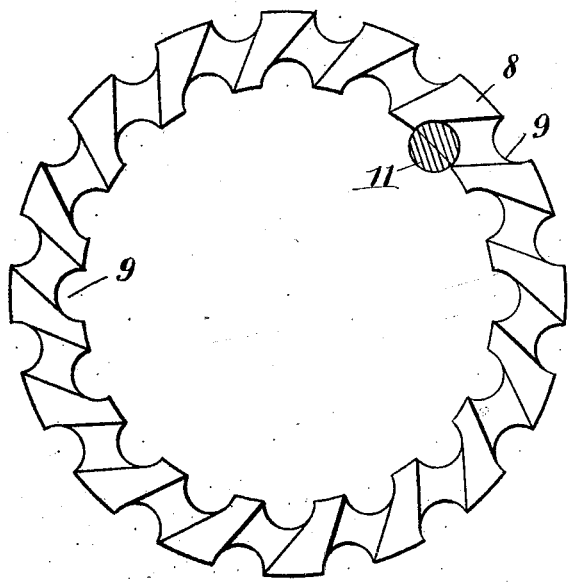
Fig. 3 is a side elevation of the foundation removed from the tire core.

Referring now more particularly to the drawing, 8 represents a foundation formed of relatively hard rubber or other similar resilient or semi-resilient material. This foundation is circular in cross section and of annular formation, corresponding in diameter to the central axis of the tire shoe with which it is to be associated. This foundation is provided with a spiral groove 9 co-extensive with the foundation and a strand 10 of flexible resilient material is wound upon the foundation 8 in the groove 9 thereof. The strand 10 is of circular cross section and corresponds to the diameter of groove 9. The material of which the strand 10 is formed may be rubber, somewhat softer or more pliable than the material of which the foundation per se is formed. When the strand 10 is wound upon the foundation in the manner disclosed by Fig. 3, it will be observed that portions thereof project outwardly beyond the outer circumference of the foundation 8, and several wrappings of the strand are disposed at varying angles. The meeting ends of these strands may be cut away and overlapped and then secured together as by cementing, vulcanizing or in any other approved manner.

After the foundation has been wrapped with the strand 10 and the ends of the latter have been secured, the resultant core is placed within a mold and maintained therein spaced even distances from the walls of the mold. The latter is then filled with plastic rubber, so that the latter entirely envelops the wrapped foundation and gains access to all grooves and recesses, thus firmly securing the foundation and the strand 10 together, and firmly embodying the wrapped foundation in the fillet 12 of the surrounding rubber. The mold will be of a shape and size corresponding with the shape and size of the shoe with which the cushion tire is to be used.

The mold will also be provided with suitable recesses at proper intervals, causing lugs 14 to be formed in the inner periphery of the fillet for engagement in recesses in a wheel rim. These lugs will seat within rim recesses so as to hold the fillet properly assembled upon the rim and against both latteral and circumferential movements thereon. The lugs 14 may be reinforced by more rigid elements projecting into the fillet and firmly anchored therein.

The tire cord thus constructed is enclosed by a shoe and the latter may have proper tread reinforcement if desired, and may be beaded to adapt itself to a demountable rim. With the tire core thus constructed and assembled upon the rim, danger of detachment of the same is eliminated, as the lugs 14 will be firmly seated in proper recesses in the outer surface of the rim.

With a tire core thus constructed, it is apparent that a high degree of resiliency is obtained, due to the special construction and assemblage set forth. The relatively hard foundation 8, wrapped with a more elastic wrapping, such as the strand 10, and centered and firmly anchored within the pliable fillet 12, provides a tire core possessing a high degree of resiliency and yet of sufficient strength and toughness to withstand the severe strains and wear to which it must necessarily be subjected.

Having thus described my invention, I claim:

1. A tire filler having a spiral passage extending longitudinally of said filler and a strand of more pliable material within said passage.

2. A tire filler composed of resilient material and having a spiral circular passage extending longitudinally thereof and a strand of more pliable material within said passage.

In testimony whereof I affix my signature.

JOSEPH FINDLING.